United States Patent
Zhang et al.

(10) Patent No.: US 9,519,839 B2
(45) Date of Patent: Dec. 13, 2016

(54) ILLUMINATION ESTIMATION USING NATURAL SCENE STATISTICS

(71) Applicant: Texas Instruments Incorporated, Dallas, TX (US)

(72) Inventors: Buyue Zhang, Plano, TX (US); Aziz Umit Batur, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 107 days.

(21) Appl. No.: 14/188,670

(22) Filed: Feb. 24, 2014

(65) Prior Publication Data

US 2014/0241620 A1 Aug. 28, 2014

Related U.S. Application Data

(60) Provisional application No. 61/768,592, filed on Feb. 25, 2013.

(51) Int. Cl.
*G06K 9/00* (2006.01)
*G06K 9/46* (2006.01)
*G06T 5/00* (2006.01)
*H04N 9/73* (2006.01)

(52) U.S. Cl.
CPC .......... *G06K 9/4661* (2013.01); *G06K 9/4652* (2013.01); *G06T 5/007* (2013.01); *G06T 5/009* (2013.01); *H04N 9/73* (2013.01); *H04N 9/735* (2013.01)

(58) Field of Classification Search
USPC ....... 382/100, 156, 159, 160, 162, 165, 167, 382/224, 225, 254, 274, 275
See application file for complete search history.

(56) References Cited

U.S. PATENT DOCUMENTS

| | | | | |
|---|---|---|---|---|
| 5,907,629 A | * | 5/1999 | Funt | G06K 9/4652 382/156 |
| 6,038,339 A | * | 3/2000 | Hubel | G06T 7/408 382/162 |
| 7,019,776 B1 | * | 3/2006 | Lin | H04N 9/735 382/162 |
| 7,421,121 B2 | * | 9/2008 | Sachs | H04N 9/735 382/167 |
| 7,576,797 B2 | * | 8/2009 | Kehtarnavaz | H04N 9/735 348/229.1 |
| 7,885,458 B1 | * | 2/2011 | Lin | H04N 9/73 382/162 |
| 8,229,215 B2 | * | 7/2012 | Li | H04N 9/735 382/162 |
| 8,384,796 B2 | | 2/2013 | Zhang | |
| 8,547,450 B2 | | 10/2013 | Zhang | |

(Continued)

*Primary Examiner* — Eric Rush

(74) *Attorney, Agent, or Firm* — Gregory J. Albin; Frank D. Cimino

(57) ABSTRACT

A method for estimating illumination of an image captured by a digital system is provided that includes computing a feature vector for the image, identifying at least one best reference illumination class for the image from a plurality of predetermined reference illumination classes using the feature vector, an illumination classifier, and predetermined classification parameters corresponding to each reference illumination class, and computing information for further processing of the image based on the at least one best reference illumination class, wherein the information is at least one selected from a group consisting of color temperature and white balance gains.

18 Claims, 5 Drawing Sheets

(56) References Cited

U.S. PATENT DOCUMENTS

| | | | |
|---|---|---|---|
| 2003/0052978 A1* | 3/2003 | Kehtarnavaz | H04N 9/735 348/223.1 |
| 2006/0232684 A1* | 10/2006 | Miki | H04N 9/735 348/223.1 |
| 2008/0101690 A1* | 5/2008 | Hsu | H04N 1/6027 382/162 |
| 2010/0008573 A1* | 1/2010 | Tajbakhsh | H04N 9/735 382/167 |
| 2010/0020193 A1 | 1/2010 | Zhang et al. | |
| 2010/0149420 A1 | 6/2010 | Zhang et al. | |
| 2010/0194918 A1 | 8/2010 | Zhang et al. | |
| 2011/0187891 A1 | 8/2011 | Zhang | |
| 2011/0285745 A1 | 11/2011 | Zhang et al. | |
| 2012/0155763 A1 | 6/2012 | Zhang et al. | |
| 2013/0278792 A1 | 10/2013 | Zhang | |

\* cited by examiner

ILLUMINATION ESTIMATION USING NATURAL SCENE STATISTICS

CROSS-REFERENCE TO RELATED APPLICATIONS

This application claims benefit of U.S. Provisional Patent Application Ser. No. 61/768,592, filed Feb. 25, 2013, which is incorporated herein by reference in its entirety.

BACKGROUND OF THE INVENTION

1. Field of the Invention

Embodiments of the present invention generally relate to illumination estimation using natural scene statistics.

2. Description of the Related Art

White balance is the process of removing unrealistic color cast from a digital image caused by the color of the illumination. Human eyes automatically adapt to the color of the illumination, such that white will always appear white. Unfortunately, image capture devices (e.g., camera sensors) cannot adapt automatically. Therefore, white balance techniques are needed for image sensors in image capture systems (e.g., a digital camera) to compensate for the effect of illumination.

Automatic white balance (AWB) in digital cameras typically includes two parts: illumination estimation and white balance correction. Illumination estimation is the first and most important step in AWB. After scene illumination is estimated, the corresponding white balance correction gains are estimated, and the gains are applied to the raw image, which completes the process of white balancing an image. One significant challenge in some AWB techniques is that images with dominant non-neutral object color tend to bias the AWB decision in the direction of an incorrect illumination.

SUMMARY

Embodiments of the invention relate to methods and apparatus for illumination estimation using natural scene statistics. In one aspect, a method for estimating illumination of an image captured by a digital system is provided that includes computing a feature vector for the image, identifying at least one best reference illumination class for the image from a plurality of predetermined reference illumination classes using the feature vector, an illumination classifier, and predetermined classification parameters corresponding to each reference illumination class, and computing information for further processing of the image based on the at least one best reference illumination class, wherein the information is at least one selected from a group consisting of color temperature and white balance gains.

In one aspect, a computer-implemented method for training an illumination classifier is provided that includes computing ground truth white balance gains for each training image of a plurality of training images, clustering the training images into reference illumination classes based on the ground truth white balance gains, deriving feature vectors for each training image in each reference illumination class, and training an illumination classifier for the reference illumination classes based on the feature vectors, wherein classification parameters for each reference illumination class are determined.

In one aspect, an apparatus configured to estimate illumination of an image is provided that includes means for capturing the image, means for computing a feature vector for the image, means for identifying at least one best reference illumination class for the image from a plurality of predetermined reference illumination classes using the feature vector, an illumination classifier, and predetermined classification parameters corresponding to each reference illumination class, and means for computing information for further processing of the image based on the at least one best reference illumination class, wherein the information is at least one selected from a group consisting of color temperature and white balance gains.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
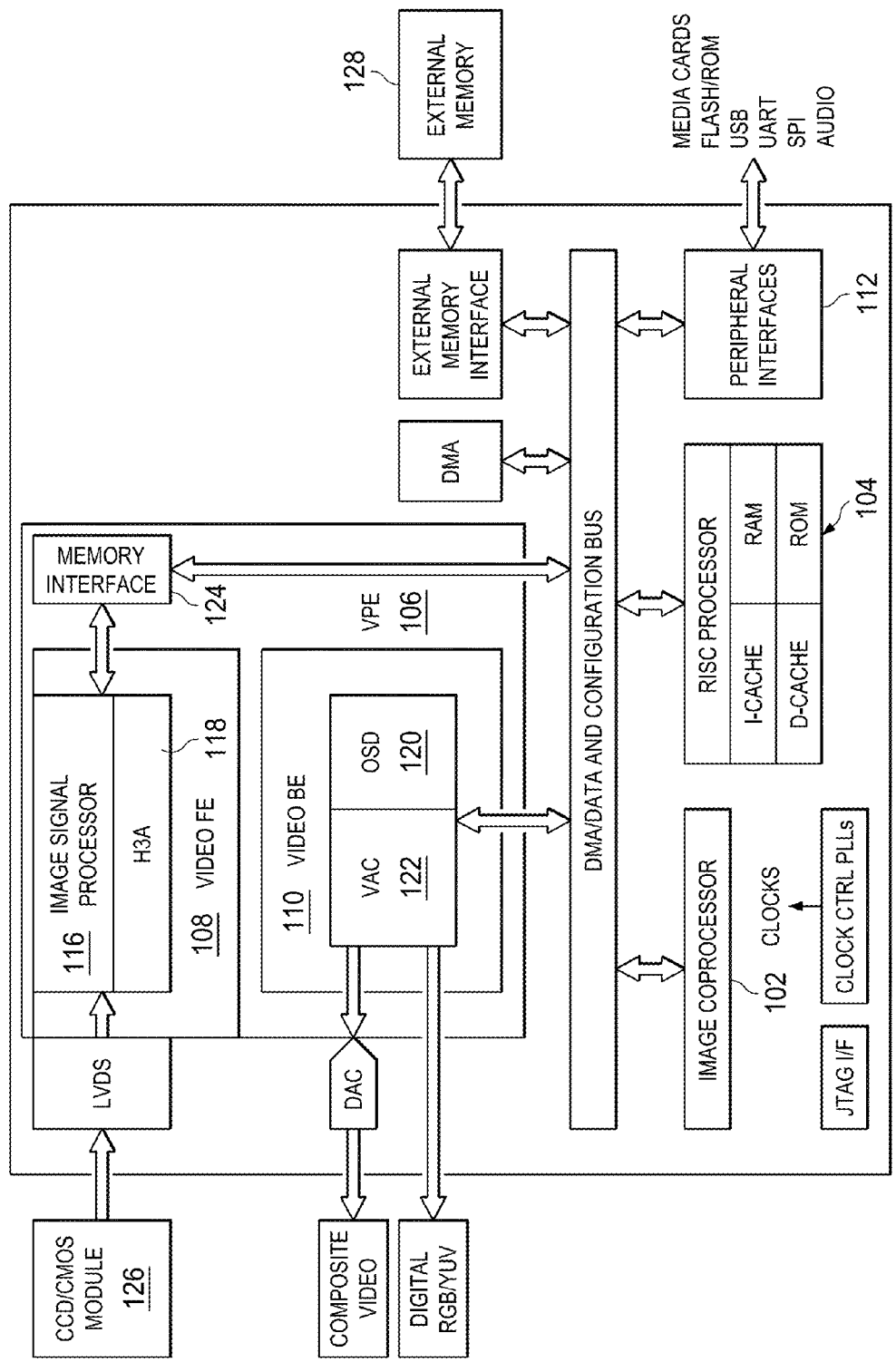
FIG. 1 is a block diagram of an example digital system configured to perform illumination estimation using natural scene statistics.

Specific embodiments of the invention will now be described in detail with reference to the accompanying figures. Like elements in the various figures are denoted by like reference numerals for consistency. As used herein, an image may be a single still picture of a scene or may be a frame in a video stream.

Embodiments of the invention provide for illumination estimation using natural image statistics in image processing. The use of natural image statistics for illumination estimation may improve auto white balance (AWB) by ameliorating the bias toward the wrong illumination that may be caused by images with dominant non-neutral object color. More specifically, in a training phase, reference illumination classes are derived from a large database of natural images. Feature vectors are derived for images in these reference illumination classes and an illumination classifier is trained based on these feature vectors. The resulting classifier parameters for the reference illumination classes (along with associated color temperatures and white balance gains) may then be stored in a digital camera and used for illumination estimation during processing of images captured by the camera.

In a digital camera, the illumination of captured images is estimated based on the classifier parameters of the reference illumination classes. More specifically, a feature vector is computed for captured image in the same way as the feature vectors were computed for images of the reference illumination classes. An illumination classifier (the same as the one used to generate the classifier parameters of the reference illumination classes) is then used to compare the feature vector to the parameters of the reference illumination classes to identify a subset of the reference illumination classes that are closest to the illumination of the input image. The color temperature and/or white balance gains of the image may then be determined based on the color temperatures and white balance gains of this subset of the reference illumination classes.

FIG. 1 shows a digital system suitable for an embedded system (e.g., a digital camera) configured to perform illumination estimation using natural image statistics as described herein. The digital system includes a DSP-based image coprocessor (ICP) 102, a RISC processor 104, and a video processing engine (VPE) 106. The RISC processor 104 may be any suitably configured RISC processor. The VPE 106 includes a configurable video processing front-end (Video FE) 108 input interface used for video capture from imaging peripherals such as image sensors, video decoders, etc., a configurable video processing back-end (Video BE) 110 output interface used for display devices such as SDTV displays, digital LCD panels, HDTV video encoders, etc, and memory interface 124 shared by the Video FE 108 and the Video BE 110. The digital system also includes peripheral interfaces 112 for various peripherals that may include a multi-media card, an audio serial port, a Universal Serial Bus (USB) controller, a serial port interface, etc.

The Video FE 108 includes an image signal processor (ISP) 116, and a 3A statistics generator 118. The ISP 116 provides an interface to image sensors and digital video sources. More specifically, the ISP 116 may accept raw image/video data from a sensor module 126 (e.g., CMOS (complementary metal oxide semi-conductor) or CCD (charge-coupled device)) and can accept YUV video data in numerous formats. The ISP 116 also includes a parameterized image processing module with functionality to generate image data in a color format (e.g., RGB) from raw sensor data. The ISP 116 is customizable for each sensor type and supports video frame rates for preview displays of captured digital images and for video recording modes. The ISP 116 also includes, among other functionality, an image resizer, statistics collection functionality, and a boundary signal calculator. The 3A module 118 includes functionality to support control loops for auto focus, auto white balance, and auto exposure by collecting metrics on the raw image data from the ISP 116 or external memory. In one or more embodiments, the Video FE 108 is configured to perform illumination estimation using natural image statistics as described herein.

The Video BE 110 includes an on-screen display engine (OSD) 120 and a video analog encoder (VAC) 122. The OSD engine 120 includes functionality to manage display data in various formats for several different types of hardware display windows and to handle gathering and blending of video data and display/bitmap data into a single display window before providing the data to the VAC 122 in a color space format (e.g., RGB, YUV, YCbCr). The VAC 122 includes functionality to take the display frame from the OSD engine 120 and format it into the desired output format and output signals required to interface to display devices. The VAC 122 may interface to composite NTSC/PAL video devices, S-Video devices, digital LCD devices, high-definition video encoders, DVI/HDMI devices, etc.

The memory interface 124 functions as the primary source and sink to modules in the Video FE 108 and the Video BE 110 that are requesting and/or transferring data to/from external memory 128. The memory interface 124 includes read and write buffers and arbitration logic.

The ICP 102 includes functionality to perform the computational operations required for compression and other processing of captured images. The video compression standards supported may include, for example, one or more of the JPEG standards, the MPEG standards, the H.26x standards, and the HEVC standard. In one or more embodiments, the ICP 102 may be configured to perform at least some of the computational operations of illumination estimation using natural image statistics.

In operation, images of a scene are captured by the sensor module 126 and provided to the video FE 108. The video FE 108 converts each image to the input format needed to perform video compression. Prior to the compression, illumination estimation using natural image statistics as described herein may be performed as part of processing the image in the image pipeline of the video FE 108. As is explained in more detail herein, the illumination estimation uses an illumination classifier to compare a feature vector of an image to reference illumination classes. Predetermined classifier parameters for the reference illumination classes and associated color temperatures and white balance gains determined as described herein may be stored in external memory 128. The color temperature and/or white balance gains corresponding to the estimated illumination may be used for further processing of the image in the image pipeline. The video data generated by the video FE 108 is stored in the external memory. The video data is then encoded, i.e., compressed. During the compression process, the video data is read from the external memory and the compression computations on this video data are performed by the image coprocessor 102. The resulting compressed video data is stored in the external memory. The compressed video data may then be read from the external memory, decoded, and post-processed by the video BE 110 to display the image.

Figure 2:
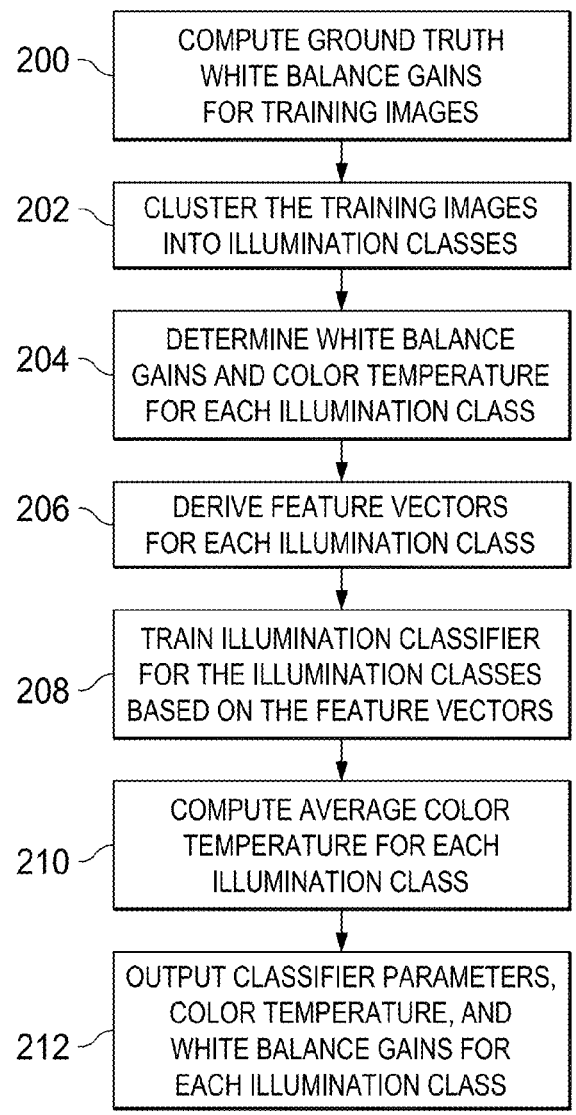
FIG. 2 is a flow diagram of a method for training an illumination classifier for illumination estimation using natural scene statistics.

FIG. 2 is a flow diagram of a method for training an illumination classifier for illumination estimation using a database of training images captured under a representative variety of illumination conditions. The number of training images used should be large, e.g., 700, in order to be representative of the types of pictures people generally want to take and the lighting conditions under which the pictures would be taken. In general, the training images should be natural images of scenes and places that people would typically want to use a camera to capture, such as landscapes, landmarks, plants, buildings, flowers, people, children, office, home, restaurants, bars, etc. Further, training images should be captured under all types of weather, illumination, brightness levels, and color temperatures, e.g., sunny, cloudy, deep shade, different types of fluorescent lighting, different types of incandescent lighting, etc.

Figure 3:
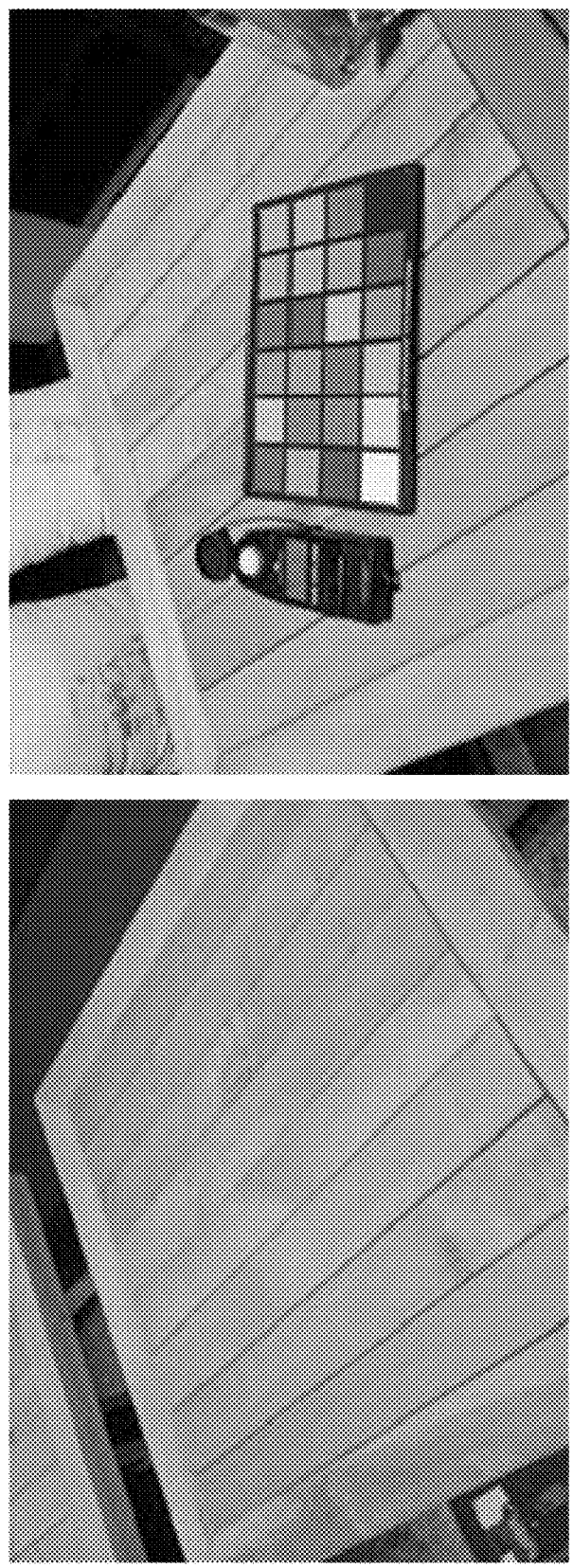
FIG. 3 is an example of a pair of training images of the same scene captured without and without a color checker.

During outdoor sunny days, color temperature varies significantly from dawn to dusk so training images in the outdoor environment should be captured periodically, e.g., every 1 to 2 hours. Further, training images should be captured at different geographical locations as the color temperature of the sun varies at different geographical locations. Thus, training images should include images from, e.g., North America, Europe, and Asia. Further, for each scene captured (each training image), the ground truth color temperature of the scene should be recorded, e.g., using a Chroma Meter. For each captured training image, a reference image should also be captured that includes a color checker such as a Macbeth Color Checker, or a Color-Checker SG, or a test target consisting of pure gray. FIG. 3 shows an example scene of a wood table and a reference shot of the scene including a color checker and a Chroma Meter. Note that the reference images are not included in the training images. As is explained in more detail below, the reference images are used to obtain the ground truth color temperature and white balance gains for the scene of the corresponding training images.

Figure 4:
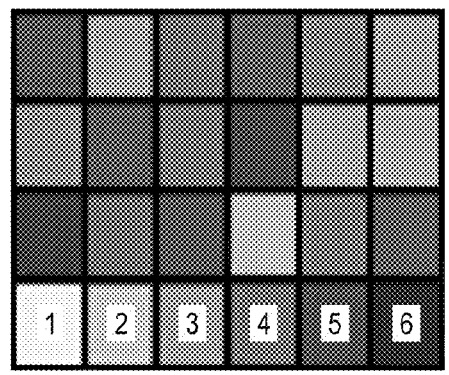
FIG. 4 is a Macbeth color checker with six gray patches.

As shown in FIG. 2, initially, ground truth white balance gains are computed 200 for each of the training images. For each training image, the one or more gray patches in the color checker or other gray patch test target captured in the associated reference image may be used to extract the ground truth white balance gain for the scene. For example, assume the Macbeth color checker of FIG. 4 is used in the associated reference image. The ground truth white balance gains for the scene of the training image may be determined as follows. The third gray patch (labeled 3 in FIG. 4) is cropped and the R (red), G (green), B (blue) values of the gray pixels in the cropped area are accumulated (summed). The ground truth white balance R, G, B gains for the scene are the computed as sumG/sumR, 1.0, sumG/sumB for the red, green, and blue channels respectively, where sumR, sumG, and sumB are the accumulated R, G, B values. Alternatively, multiple gray patches, e.g., patches 3 and 4, or patches 2, 3, 4, and 5, can be used to compute the ground truth gains in a similar fashion.

Referring again to FIG. 2, the training images are then clustered 202 into reference illumination classes based on the ground truth white balance gains computed for the images. Note that RGB ground truth white balance gains are closely related to scene illumination. Any suitable clustering algorithm may be used to perform the clustering. In some embodiments, the well-known K-means clustering algorithm is used. In some embodiments, the number of illumination classes into which the images are to be clustered is determined empirically, e.g., by plotting the ground truth white balance gains and examining the plot for clusters. In some embodiments, the clustering algorithm automatically determines the number of clusters. The clustering may done in the RGB space directly, or to reduce data dimensionality, the gains may be transformed into [R/G B/G] gain ratios (where R is the red gain, G is the green gain, and B is the blue gain), and the sets of gain ratios may be clustered. In some embodiments, the number of training images is 700 and the empirically chosen number of illumination classes/clusters is 12.

The ground truth white balance gains and ground truth color temperature for each reference illumination class is then determined 204. The gains (or the R/G and B/G) for the cluster center of an illumination class may be selected as the ground truth white balance gains of the class and the color temperature of the cluster center is selected as the ground truth color temperature of the class. As previously mentioned, the ground truth color temperature of each of the training images is recorded when the images are captured. Determination of the cluster center may depend on the particular clustering algorithm used. For example, for k-means clustering, the center of a cluster is the "mean" of the cluster. Therefore, the ground truth white balance gains and color temperature of the cluster center may be computed, respectively, as means of the white balance gains and the mean of the color temperatures of the training images in the cluster.

Feature vectors are also derived 206 for each reference illumination class. In general, a feature vector may be a collection of features that describe a class, and separate one class from another. The features are usually arranged in a vector, hence, the name feature vector. Any number of features may be used. In particular, the features used should maximize the inter-class distance, while minimizing intra-class distance. In some embodiments, a two-dimensional (2D) chromaticity histogram of a training image is used as the feature vector for each image in each illumination class, after re-arranging the histogram, e.g., in raster order, from a 2D matrix to a one-dimensional (1D) vector. A chromaticity histogram for an image may be computed as follows. First, the image is converted from RGB to YCbCr, which is a standard color transformation. Then, Cb/Y and Cr/Y is computed for each pixel to remove the influence of luminance and reduce the dimension of the data from 3 to 2. Then, the Cb/Y values are is quantized into H1 bins and the Cr/Y values are quantized into H2 bins, where the values of H1 and H2 may be empirically determined. In some embodiments, H1=35 and H2=32. Then, the number of pixels in each bin of (Cb/Y)/H1 width and (Cr/Y)/H2 height is counted to form an H1×H2 chromaticity histogram for the image.

Figure 5:
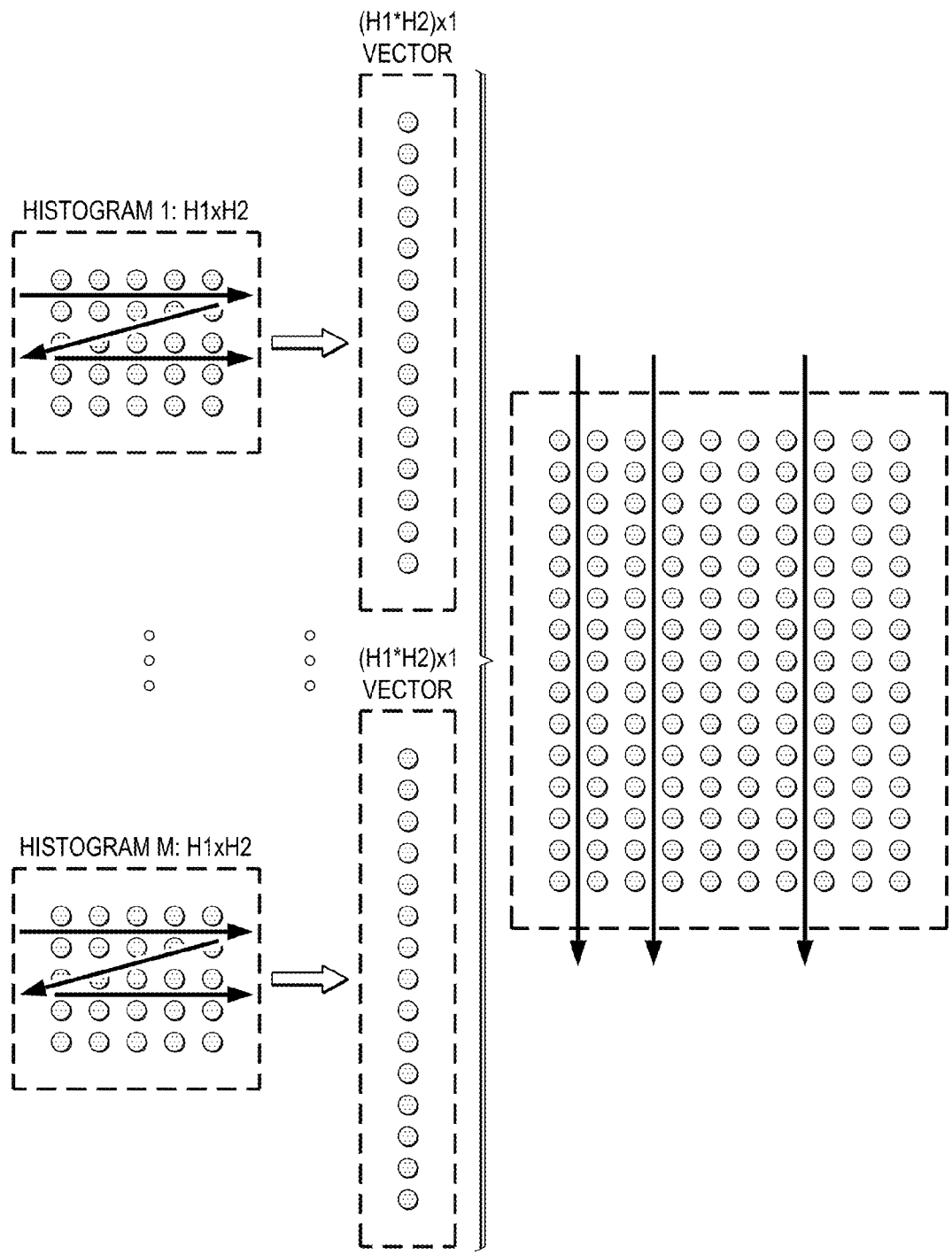
FIG. 5 is an example illustrating construction of a feature matrix in the method of FIG. 2.

To reduce the influence of the dominant object color, thresholding and normalization is performed on the histogram $Hist_1$ as follows. Each value in $Hist_1$ is compared to a threshold Th. If the value is less or equal to Th, the value is not changed; otherwise, the value is set to Th. The resulting histogram after applying the threshold is denoted as $Hist_2$. The sum of all the values in $Hist_2$, denoted as $SUM_h$, is computed and each value in $Hist_2$ is multiplied by (TotalP/$SUM_h$) to generate a histogram denoted as $Hist_3$, where TotalP is the total number of pixels in the image. This operation guarantees that after the thresholding and cropping operation, $Hist_3$ maintains the same volume for all images. In some embodiments, Th=10%*TotalP. Other techniques for computing the histograms may also be used. For example, instead of using the chromaticity histogram, a 3-D histogram can be computed in [R G B] space. One practical way of reducing data dimensionality for an RGB histogram is to build the histogram in [R/G B/G] space stead of [R G B] space. A feature vector for each image is formed by arranging the H1×H2 histogram of the image in a vector as illustrated in FIG. 5. In some embodiments, the feature vector for each image may also include other data such as analog gain, exposure time, etc. In such embodiments, the additional data may be added as elements at the end of the feature vector.

Referring again to FIG. 2, an illumination classifier is then trained for the reference illumination classes based on the feature vectors 208, i.e., parameters for the classifier are computed using the feature vectors. At this point, each of the illumination classes represents one type of illumination and has an associated set of white balance gains and an associated color temperature. Any suitable classifier may be used, such as, for example, linear discriminants, Gaussian mixture models, and neural networks. In some embodiments, a multivariate Gaussian model (MVG) classifier is used. In such embodiments, an MVG model is fit to all the feature vectors of each illumination class as follows. The mean $\mu_i$ and covariance $\Sigma^i$ matrices of a feature matrix $F_i$ are computed for each illumination class i as per $$\mu_i = \frac{1}{M_i} \sum_{n=1}^{M_i} F_i(m, n), \quad (1)$$

$$i = 1, 2, 3, \ldots, N$$

$$\sum_{j,k}^{i} = \text{cov}(F_i(:,j), F_i(:,k)), \quad (2)$$

$$i = 1, 2, 3, \ldots, N$$

where N is the number of images in an illumination class i, $M_i$ is the total number of images in the illumination class i, $\Sigma_{j,k}^i$ is the (j,k)-th element of covariance matrix $\Sigma^i$, and cov(X,Y) is the operation of computing covariance between vectors X and Y. A feature matrix $F_i$ for each illumination class i is constructed as illustrated in FIG. 5. First, the histogram from the H1×H2 matrix for each image in the illumination class is transformed to a vector of (H1*H2)×1 by taking each element of the matrix in raster scan order to form a vector. Then, the vectors for each histogram in the class are arranged as columns of an (H1*H2)×M matrix, assuming there are a total of M images in the class. In embodiments in which additional features are used such as exposure information, these features are concatenated to the end of the histogram vector. The vector will be then become (H1*H2+E)×1, where E is the number of additional features. The feature matrix $F_i$ is then an (H1*H2+E)×M matrix.

Referring again to FIG. 2, the average color temperature for each reference illumination class is then computed 210. The average color temperature $T_i$ for an illumination class i may be computed as per $$T_i = \frac{1}{M_i} \sum_{n=1}^{M_i} t_i(n), \quad (3)$$

$$i = 1, 2, 3, \ldots, N$$

where $T_i$ the estimated color temperature of the i-th illumination class, and $t_i(n)$ is the color temperature of the n-th image in the i-th illumination class.

Finally, the illumination classifier parameters, e.g., ($\mu_i$, $\Sigma^i$, $T_i$), i=1, 2, . . . , N, for the N illumination classes and the white balance gains for each of the classes are output 212. The white balance gains for class i are computed in a similar way as the color temperature $T_i$ (Eq. 3), i.e., by computing the average R gain, G gain, and B gain of all the training images in an illumination class i. These parameters and the associated white balance gains may be stored, for example, in an external memory of a digital camera such as that of FIG. 1 for use in a method for illumination estimation such as that of FIG. 6.

Figure 6:
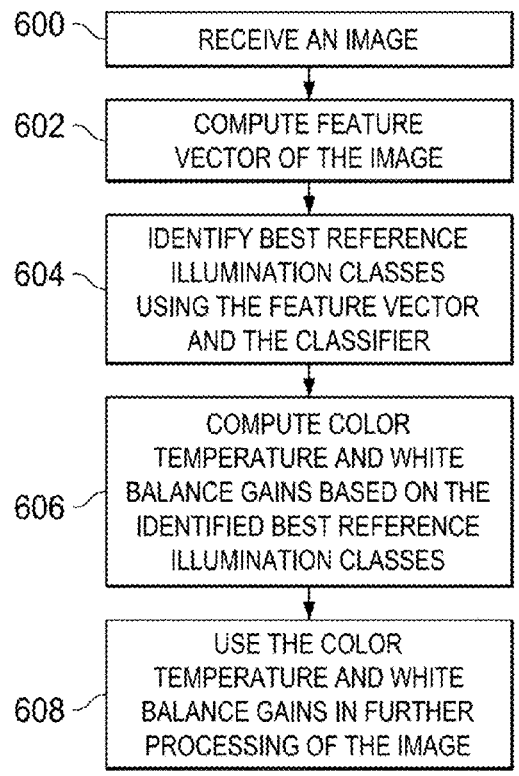
FIG. 6 is a flow diagram of a method for illumination estimation using natural scene statistics that may be performed by the digital system of FIG. 1.

FIG. 6 is a flow diagram of a method for illumination estimation using natural scene statistics that may be performed in a digital system such as that of FIG. 1. This method assumes that illumination classifier parameters for reference illumination classes and associate white balance gains as generated by the method of FIG. 2 are available for the illumination estimation. In general, the illumination estimation for a given image captured by the digital system is based on the probability of observing the image data under each reference illumination class. In some embodiments, the final color temperature and white balance gains for the image are computed based on the color temperatures and white balance gains of the top M most likely reference illumination classes. In some embodiments, the top most probable illumination, i.e., the illumination reference class with the highest probability, is selected as the estimated illumination and the color temperature and white balance gains of this class are used for the image. Using M>1 may improve the robustness of the method. The method is explained assuming M>1. One of ordinary skill in the art will understand embodiments in which M=1 without need of additional explanation.

Initially, an image is received 600 and a feature vector is computed 602 for the image. The feature vector is computed in the same way as feature vectors for the images of the reference illumination classes were computed. For example, a chromaticity histogram may be computed for the image by converting the RGB of the image IMG to Cb/Y—Cr/Y and computing the histogram $H_{IMG}$ in Cb/Y—Cr/Y space as previously described.

Next, the best reference illumination classes for the image are identified 604 using the illumination classifier and the feature vector of the image. More specifically, a subset of L reference illumination classes that are closest to the illumination of the image are determined using the illumination classifier and the feature vector. The number of classes in the subset, i.e., the value of L, may be empirically determined. In some embodiments, L=3. In embodiments in which the illumination classifier is an MVG classifier, the probability P of observing the current image data IMG in each of the reference illumination classes is computed as per $$P(I_i | IMG) = \frac{1}{(2\pi)^{k/2} |\Sigma^i|^{1/2}} \exp\left(-\frac{1}{2}(H_{IMG} - \mu_i)^T \sum\nolimits^{-1} (H_{IMG} - \mu_i)\right), \quad (4)$$

$$i = 1, 2, \ldots, N$$

where $k = H_1 \cdot H_2$ is the dimension of the feature vector and $\mu_i$ and $\Sigma^i$ are the classifier parameters for reference illumination class i. After computing the probability scores, the L illumination classes with the highest probability scores are selected.

In some embodiments, in order to ensure that the range of Cb/Y and Cr/Y in the chromaticity histogram covers all possible colors for each reference illumination class (the gamut), the resulting chromaticity histograms may have many zeros. Thus, $\Sigma^i$ is a sparse matrix and ill-posed. Thus, Eq. 4 above cannot be directly used for illumination estimation. Instead, the computation is approximated by ignoring of all the covariance terms (non-diagonal elements) in $\Sigma^i$ which are much smaller than the variances (diagonal elements), i.e., $$\sum\nolimits^i \approx \begin{pmatrix} \sigma_{i,1}^2 & 0 & \ldots & 0 \\ 0 & \sigma_{i,2}^2 & \ldots & 0 \\ \vdots & \vdots & \ddots & \vdots \\ 0 & 0 & \ldots & \sigma_{i,k}^2 \end{pmatrix} \quad (5)$$

Therefore, $$P(I_i | IMG) \approx \frac{1}{(2\pi)^{k/2} \prod_{j=1}^{k} \sigma_{i,j}} \exp\left(-\frac{1}{2} \sum_{j=1}^{k} \frac{1}{\sigma_{i,j}^2} (H_{IMG}(j) - \mu_i(j))^2\right), \quad (6)$$

$$i = 1, 2, \ldots, N$$

Furthermore, any $\sigma_{i,j}^2$ (i=1, 2, . . . , N and j=1, 2, . . . , k) that has a zero value is replaced with a very small number $\epsilon$. In some embodiments, $\epsilon = 0.002$.

In some embodiments, rather than computing the MVG probability of the reference illumination classes, the Mahalanobis distance of the image data IMG to each reference illumination class is computed to improve computation efficiency. Computing exponentials as in the above MVG probability equations is computational expensive and is typically avoided in embedded applications. The Mahalanobis distance is essentially the weighted Euclidean distance inside the exponential of the probability in Eq. 6 and may computed as per $$Mah(I_i) = \sum_{j=1}^{k} \frac{1}{\sigma_{i,j}^2}(H_{IMG}(j) - \mu_i(j))^2, \quad (7)$$

$$i = 1, 2, \ldots, N$$

The values of $Mah(I_i)$ $i=1, 2, \ldots, N$ are sorted in ascending order such that the top L illuminations with the smallest Mahalanobis distance are $I_1, I_2, \ldots, I_L$.

The color temperature $\hat{T}$ and the white balance gains $\{\hat{G}_r, \hat{G}_g, \hat{G}_b\}$ for the image are then computed 606 based on the identified best reference illumination classes. In general, the color temperature $\hat{T}$ may be computed as a weighted average of the color temperatures of the identified best reference illumination classes. Similarly, the white balance gains $\{\hat{G}_r, \hat{G}_g, \hat{G}_b\}$ may be computed as weighted averages of the white balance gains of the identified best reference illumination classes.

In embodiments in which the best reference illumination classes are identified based on MVG probabilities (Eq. 4 or Eq. 6), the color temperature $\hat{T}$ is computed as per $$\hat{T} = \frac{1}{\sum_{j=1}^{L} P(I_j \mid IMG)} \sum_{j=1}^{L} P(I_j \mid IMG) \cdot T_j \quad (8)$$

where, $T_1, T_2, \ldots, T_L$ are the average color temperatures of each of the L illumination classes determined by the method of FIG. 2.

In embodiments in which the best reference illumination classes are identified based on Mahalanobis distance (Eq. 7), the color temperature $\hat{T}$ is computed as per If $Mah(I_1)=0$, then $\hat{T}=T_1$ If $Mah(I_1)\neq 0$, then $Mah(I_i)\neq 0$ for all $i \geq 1$, and (9)

$$\hat{T} = \sum_{j=1}^{L} w_j \cdot T_j \quad (10)$$

where $T_1, T_2, \ldots, T_L$ are the average color temperatures of each of the L illumination classes determined by the method of FIG. 2 and $w_j$ is the weight for illumination $I_j$, computed as per $$w_j = \frac{\frac{1}{Mah(I_j)}}{\sum_{i=1}^{N} \frac{1}{Mah(I_i)}}. \quad (11)$$

In embodiments in which the best reference illumination classes are identified based on MVG probabilities (Eq. 4 or Eq. 6), the white balance gains $\{\hat{G}_r, \hat{G}_g, \hat{G}_b\}$ are computed as per $$\hat{G}_k = \frac{1}{\sum_{j=1}^{L} P(I_j \mid IMG)} \sum_{j=1}^{L} P(I_j \mid IMG) \cdot G_k^j \quad (12)$$

where k indexes the RGB color channels, k=R, G, or B, and $G_k^1, G_k^2, \ldots, G_k^L$ are the average white balance gain for channel k of each of the L illumination classes determined by the method of FIG. 2.

In embodiments in which best reference illumination classes are identified based on Mahalanobis distance (Eq. 7), the white balance gains $\{\hat{G}_r, \hat{G}_g, \hat{G}_b\}$ are computed as per If $Mah(I_1)=0$, then $\hat{G}_k=G_k^1$ If $Mah(I_1)\neq 0$, then $Mah(I_i)\neq 0$ for all $i \geq 1$, and (13)

$$\hat{G}_k = \sum_{j=1}^{L} w_j \cdot G_k^j, \quad (14)$$

where k indexes the RGB color channels, k=R, G, or B, $G_k^1, G_k^2, \ldots, G_k^L$ are the average white balance gain for channel k of each of the L illumination classes determined by the method of FIG. 2, and $w_j$ is computed as per Eq. 11.

The color temperature, and white balance gains are then used 608 in further processing of the image. For example, the gains may be used to white balance the image and the estimated color temperature may be used to perform RGB2RGB correction.

Figure 7:
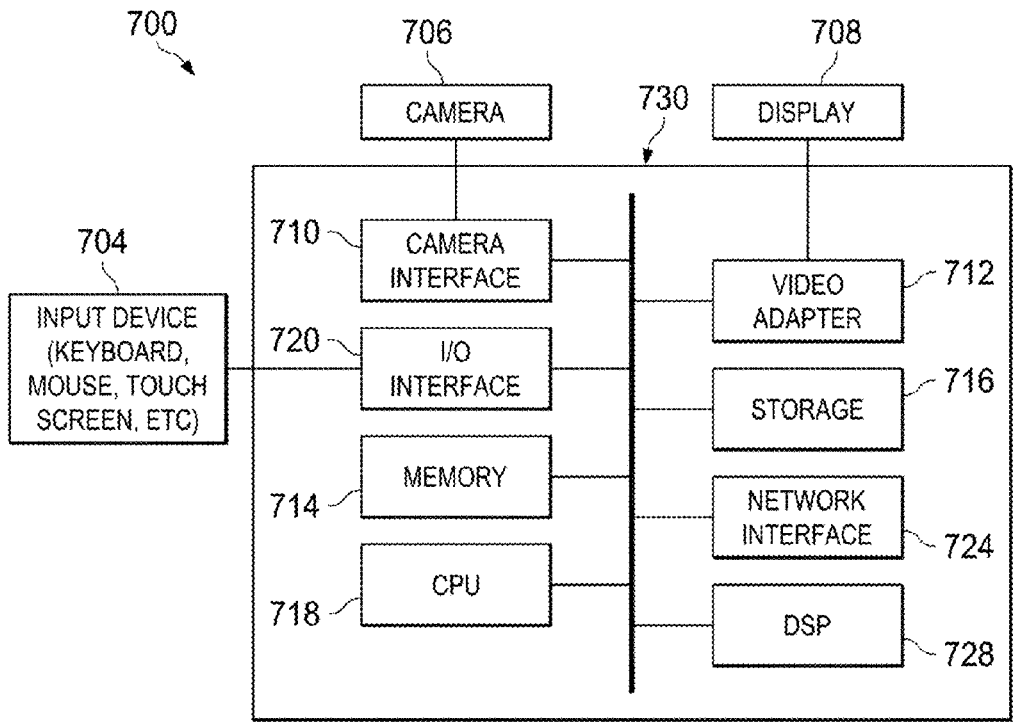
FIG. 7 is a block diagram of an example computer system configured to perform the method of FIG. 2.

FIG. 7 is a block diagram of a computer system 700 configured to perform the method of FIG. 2. The computer system 700 includes a processing unit 730 equipped with one or more input devices 704 (e.g., a mouse, a keyboard, or the like), and one or more output devices, such as a display 708, or the like. In some embodiments, the display 708 may be touch screen, thus allowing the display 708 to also function as an input device. The processing unit 730 may be, for example, a desktop computer, a workstation, a laptop computer, a dedicated unit customized for a particular application, or the like. The display may be any suitable visual display unit such as, for example, a computer monitor, an LED, LCD, or plasma display, a television, a high definition television, or a combination thereof.

The processing unit 730 includes a central processing unit (CPU) 718, memory 714, storage 716, a video adapter 712, an I/O interface 720, a DSP 728, and a network interface 724 connected to a bus. The bus may be one or more of any type of several bus architectures including a memory bus or memory controller, a peripheral bus, video bus, or the like.

The CPU 718 may be any suitable type of electronic data processor. For example, the CPU 718 may be a processor from Intel Corp., a processor from Advanced Micro Devices, Inc., a Reduced Instruction Set Computer (RISC), an Application-Specific Integrated Circuit (ASIC), or the like. The DSP 728 may be any suitable type of digital signal processor, such as, for example, a DSP of the C64x or C66x family of digital signal processors available from Texas Instruments. The CPU 718 and the DSP 728 are arranged to execute software instructions stored in the storage device 716 and/or the memory 714 to perform aspects of the method.

Storage 716 (e.g., a computer readable medium) may comprise any type of storage device configured to store data, programs, and other information and to make the data, programs, and other information accessible via the bus. Storage 716 may be, for example, one or more of a hard disk drive, a magnetic disk drive, an optical disk drive, or the like. The memory 714 (e.g., a computer readable memory) may be any suitable type of system memory such as static random access memory (SRAM), dynamic random access memory (DRAM), synchronous DRAM (SDRAM), read-only memory (ROM), flash memory, a combination thereof, or the like. Further, the memory 714 may include ROM for use at boot-up, and DRAM for data storage for use while executing programs. Separate memory and storage may be provided for the CPU 718 and the DSP 728 and/or the CPU 718 and the DSP 728 may share the memory and storage.

The software instructions implementing an embodiment of the method may be initially stored in a computer-readable medium such as a compact disc (CD), a diskette, a tape, a file, memory, or any other computer readable storage device and loaded (if needed) and executed by the DSP 728. In some cases, the software instructions may also be sold in a computer program product, which includes the computer-readable medium and packaging materials for the computer-readable medium. In some cases, the software instructions may be distributed to the computer system 700 via removable computer readable media (e.g., floppy disk, optical disk, flash memory, USB key), via a transmission path from computer readable media on another computer system (e.g., a server), etc.

The video adapter 712 and the I/O interface 720 provide interfaces to couple external input and output devices to the processing unit 730. As illustrated in FIG. 7, examples of input and output devices include the display 708 coupled to the video adapter 712 and the mouse/keyboard 704 coupled to the I/O interface 720.

The network interface 724 allows the processing unit 730 to communicate with remote units via a network (not shown). The network interface 724 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

The computer system 700 may also include other components not specifically shown. For example, the computer system 700 may include power supplies, cables, a motherboard, removable storage media, cases, and the like.

In some embodiments, some or all of the training images may be downloaded from the camera 706 via the camera interface 710 and stored in the memory 714 and/or storage 716. In some embodiments, some or all of the training mages may be received via the network interface 724 and stored in the memory 714 and/or storage 716.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, while embodiments have been described herein in which both color temperature and white balance gains are determined for illumination classes during training and are computed for an image as part of illumination estimation, one of ordinary skill in the art will understand embodiments in which only white balance gains or color temperature are used. For example, in some embodiments, the classifier parameters may not include color temperature for each reference illumination class. And, in some embodiments, the white balance gains for each reference illumination class may not be output by the training method and computed by the illumination estimation method.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for estimating illumination of an image captured by a digital system, the method comprising:
    computing, with the digital system, ground truth white balance gains for each training image of a plurality of training images;
    clustering, with the digital system, the training images into reference illumination classes based on the ground truth white balance gains;
    deriving, with the digital system, feature vectors for each training image in each reference illumination class;
    training, with the digital system, an illumination classifier based on the feature vectors, wherein classification parameters for each reference illumination class are determined;
    computing, with the digital system, a feature vector for the image;
    identifying, with the digital system, at least one best reference illumination class for the image from the reference illumination classes using the feature vector for the image, the illumination classifier, and the classification parameters corresponding to each reference illumination class;
    computing, with the digital system, information for further processing of the image based on the at least one best reference illumination class, wherein the information is at least one selected from a group consisting of color temperature and white balance gains; and
    performing, with the digital system, further processing on the image based on the information.

2. The method of claim 1, wherein the illumination classifier is a multivariate Gaussian classifier (MVG), and wherein identifying at least one best reference illumination class comprises determining probabilities of observing the image in each of the reference illumination classes.

3. The method of claim 1, wherein the illumination classifier is a multivariate Gaussian classifier (MVG), and wherein identifying at least one best reference illumination class comprises computing a Mahalanobis distance of the image to each of the plurality of reference illumination classes.

4. The method of claim 1, wherein the at least one best reference illumination class comprises multiple best reference illumination classes, and wherein computing information for further processing comprises determining the color temperature for the image based on a weighted average of predetermined color temperatures of the multiple best reference illumination classes.

5. The method of claim 1, wherein the at least one best reference illumination class comprises multiple best reference illumination classes, and wherein computing information for further processing comprises determining the white balance gains for the image as weighted averages of predetermined white balance gains of the multiple best reference illumination classes.

6. The method of claim 1, wherein the plurality of training images comprises training images captured under multiple lighting conditions in multiple geographical locations, and wherein each training image has a corresponding reference image configured to provide ground truth color temperature and ground truth white balance gains for the training image.

7. A computer-implemented method for training an illumination classifier, the method comprising:
computing, with one or more processors, ground truth white balance gains for each training image of a plurality of training images;
clustering, with the one or more processors, the training images into reference illumination classes based on the ground truth white balance gains;
deriving, with the one or more processors, feature vectors for each training image in each reference illumination class;
training, with the one or more processors, an illumination classifier for the reference illumination classes based on the feature vectors, wherein classification parameters for each reference illumination class are determined; and
performing illumination estimation on an image based on the illumination classifier.

8. The method of claim 7, wherein the plurality of training images comprises training images captured under multiple lighting conditions in multiple geographical locations, and wherein each training image has a corresponding reference image configured to provide ground truth color temperature and the ground truth white balance gains for the training image.

9. The method of claim 8, further comprising:
computing a color temperature for each reference illumination class as a mean of the ground truth color temperatures of reference images corresponding to the training images in the reference illumination class; and
computing white balance gains for each reference illumination class as means of the ground truth white balance gains computed for each training image in the reference illumination class.

10. The method of claim 7, wherein the illumination classifier is a multivariate Gaussian classifier (MVG) and the classification parameters of a reference illumination class comprise a mean vector and a covariance matrix of the feature vectors of the training images in the reference illumination class.

11. The method of claim 10, wherein training an illumination classifier includes generating a feature matrix for each reference illumination class by arranging the feature vectors of the training images in the reference illumination class as columns of the feature matrix.

12. The method of claim 7, wherein deriving feature vectors comprises computing, for each training image, a two-dimensional (2D) chromaticity histogram, reducing influence of dominant object color in the 2D chromaticity histogram, and transforming the 2D chromaticity histogram into a one-dimensional (1D) vector.

13. An apparatus configured to estimate illumination of an image, the apparatus comprising:
means for computing ground truth white balance gains for each training image of a plurality of training images;
means for clustering the training images into reference illumination classes based on the ground truth white balance gains;
means for deriving feature vectors for each training image in each reference illumination class;
means for training an illumination classifier based on the feature vectors, wherein classification parameters for each reference illumination class are determined;
means for capturing the image;
means for computing a feature vector for the image;
means for identifying at least one best reference illumination class for the image from the reference illumination classes using the feature vector for the image, the illumination classifier, and the classification parameters corresponding to each reference illumination class;
means for computing information for further processing of the image based on the at least one best reference illumination class, wherein the information is at least one selected from a group consisting of color temperature and white balance gains; and
means for performing further processing on the image based on the information.

14. The apparatus of claim 13, wherein the illumination classifier is a multivariate Gaussian classifier (MVG), and wherein the means for identifying at least one best reference illumination class determines probabilities of observing the image in each of the plurality of reference illumination classes.

15. The apparatus of claim 13, wherein the illumination classifier is a multivariate Gaussian classifier (MVG), and wherein the means for identifying at least one best reference illumination class computes a Mahalanobis distance of the image to each of the plurality of reference illumination classes.

16. The apparatus of claim 13, wherein the at least one best reference illumination class comprises multiple best reference illumination classes, and wherein the means for computing information for further processing determines the color temperature for the image based on a weighted average of predetermined color temperatures of the multiple best reference illumination classes.

17. The apparatus of claim 13, wherein the at least one best reference illumination class comprises multiple best reference illumination classes, and wherein the means for computing information for further processing determines the white balance gains for the image as weighted averages of predetermined white balance gains of the multiple best reference illumination classes.

18. The apparatus of claim 13, wherein the plurality of training images comprises training images captured under multiple lighting conditions in multiple geographical locations, and wherein each training image has a corresponding reference image configured to provide ground truth color temperature and ground truth white balance gains for the training image.

* * * * *